United States Patent
Wirola et al.

(10) Patent No.: US 9,872,144 B2
(45) Date of Patent: *Jan. 16, 2018

(54) ASSIGNING LOCATION INFORMATION TO WIRELESS LOCAL AREA NETWORK ACCESS POINTS

(71) Applicant: HERE Global B.V., Eindhoven (NL)

(72) Inventors: Lauri Wirola, Tampere (FI); Tommi Laine, Tampere (FI)

(73) Assignee: HERE Global B.V., Eindhoven (NL)

(*) Notice: Subject to any disclaimer, the term of this patent is extended or adjusted under 35 U.S.C. 154(b) by 0 days.

This patent is subject to a terminal disclaimer.

(21) Appl. No.: 15/637,506

(22) Filed: Jun. 29, 2017

(65) Prior Publication Data

US 2017/0303087 A1 Oct. 19, 2017

Related U.S. Application Data (63) Continuation of application No. 14/905,101, filed as application No. PCT/EP2014/065571 on Jul. 21, 2014, now Pat. No. 9,730,019.

(30) Foreign Application Priority Data

Aug. 1, 2013 (GB) .................................. 1313749.2

(51) Int. Cl.
*H04W 24/00* (2009.01)
*H04W 4/02* (2009.01)
(Continued)

(52) U.S. Cl.
CPC ......... *H04W 4/023* (2013.01); *H04W 64/003* (2013.01); *H04W 84/12* (2013.01)

(58) Field of Classification Search
CPC .... G01S 5/0242; G01S 5/0252; H04W 24/08; H04W 4/023; H04W 64/003
(Continued)

(56) References Cited

U.S. PATENT DOCUMENTS 7,054,627 B1 * 5/2006 Hillman .................. H04W 4/00
370/328
7,236,798 B2 * 6/2007 Beuck .................. H04W 64/00
455/436
(Continued)

FOREIGN PATENT DOCUMENTS

WO WO2005004528 1/2005
WO WO2008021889 2/2008
(Continued)

OTHER PUBLICATIONS

European Search Report for related European Application No. 14 741 315.7 dated Aug. 9, 2017.
(Continued)

*Primary Examiner* — Charles Shedrick
(74) *Attorney, Agent, or Firm* — Lempia Summerfield Katz LLC (57) ABSTRACT

An apparatus receives a message including results of measurements on signals of a WLAN access point. The apparatus determines as a first condition whether the message comprises no indication of a position obtained in a non-cell based positioning and/or no information enabling a non-cell based positioning. The apparatus determines as a second condition whether the message comprises in addition results of measurements on signals of at least one cell of a cellular communications network. If the conditions are met, the apparatus determines a position based on the results of measurements on signals of the at least one cell of a cellular communications network and causes storage of location information that is based on the determined position in a memory for the WLAN access point, in case no location information has previously been stored in the memory for the WLAN access point.

18 Claims, 5 Drawing Sheets

(51) Int. Cl.
*H04W 64/00* (2009.01)
*H04W 84/12* (2009.01)

(58) Field of Classification Search
USPC .......................................... 455/456.1–456.8
See application file for complete search history.

(56) References Cited

U.S. PATENT DOCUMENTS

| | | | | |
|---|---|---|---|---|
| 7,266,595 | B1* | 9/2007 | Black | H04L 41/0806 709/223 |
| 7,323,991 | B1* | 1/2008 | Eckert | G07C 9/00111 235/382 |
| 7,483,984 | B1* | 1/2009 | Jonker | H04L 41/22 709/203 |
| 7,613,427 | B2* | 11/2009 | Blight | G01S 5/02 455/41.1 |
| 2004/0023640 | A1* | 2/2004 | Ballai | H04L 63/10 455/411 |
| 2004/0066759 | A1* | 4/2004 | Molteni | H04L 41/048 370/329 |
| 2005/0070279 | A1* | 3/2005 | Ginzburg | H04W 48/16 455/434 |
| 2005/0232189 | A1* | 10/2005 | Loushine | H04W 64/00 370/328 |
| 2006/0095348 | A1* | 5/2006 | Jones | G01S 5/02 705/29 |
| 2006/0168438 | A1* | 7/2006 | Klein | H04L 41/0843 713/1 |
| 2006/0193299 | A1* | 8/2006 | Winget | H04L 63/0492 370/338 |
| 2006/0252408 | A1* | 11/2006 | Faccin | H04W 4/02 455/404.2 |
| 2007/0002813 | A1 | 1/2007 | Tenny et al. | |
| 2007/0004428 | A1* | 1/2007 | Morgan | G01S 5/02 455/456.1 |
| 2007/0010248 | A1* | 1/2007 | Dravida | H04W 60/00 455/435.1 |
| 2007/0066304 | A1* | 3/2007 | Lee | H04W 48/20 455/436 |
| 2007/0079376 | A1* | 4/2007 | Robert | H04L 63/1408 726/23 |
| 2007/0087761 | A1* | 4/2007 | Anjum | H04W 64/00 455/456.2 |
| 2007/0112948 | A1* | 5/2007 | Uhlik | H04L 12/14 709/223 |
| 2007/0121560 | A1* | 5/2007 | Edge | H04W 64/00 370/338 |
| 2007/0149243 | A1* | 6/2007 | Hwang | H04W 40/02 455/551 |
| 2007/0184845 | A1* | 8/2007 | Troncoso | H04W 64/00 455/456.1 |
| 2007/0258421 | A1* | 11/2007 | Alizadeh-Shabdiz | G01S 5/0252 370/338 |
| 2008/0045233 | A1 | 2/2008 | FitzGerald | |
| 2008/0057924 | A1* | 3/2008 | Stewart | G06Q 10/107 455/414.3 |
| 2008/0242298 | A1* | 10/2008 | Nylander | H04W 16/32 455/435.2 |
| 2009/0042557 | A1* | 2/2009 | Vardi | H04W 72/02 455/422.1 |
| 2009/0310585 | A1 | 12/2009 | Alizadeh-Shabdiz | |
| 2011/0143756 | A1* | 6/2011 | Gallagher | H04W 36/14 455/435.1 |

FOREIGN PATENT DOCUMENTS

| | | |
|---|---|---|
| WO | WO2008075078 | 6/2008 |
| WO | WO2012035190 | 3/2012 |
| WO | WO2013136123 | 9/2013 |
| WO | WO2013136124 | 9/2013 |
| WO | WO2013136128 | 9/2013 |
| WO | WO2014024005 | 2/2014 |
| WO | WO2014024006 | 2/2014 |
| WO | WO2014024007 | 2/2014 |
| WO | WO2014108755 | 7/2014 |
| WO | WO2014108757 | 7/2014 |
| WO | WO2014108765 | 7/2014 |
| WO | WO2014128527 | 8/2014 |
| WO | WO2014128534 | 8/2014 |

OTHER PUBLICATIONS

GB Search Report cited in Application No. GB1313749.2, dated Jan. 15, 2014.
International Search Report and Written Opinion cited in PCT/EP2014/065571, dated Jan. 16, 2015.
Laura Koski, Positioning with Bayesian Coverage Area Estimates and Location Fingerprints, University of Tampere, Master's Thesis, Department of Mathematics and Statistics Mathematics, Mar. 2010.

* cited by examiner

FIG. 7 ved value of 1 mW, etc.).
ASSIGNING LOCATION INFORMATION TO WIRELESS LOCAL AREA NETWORK ACCESS POINTS This application is a continuation under 35 U.S.C §120 and 37 CRF §1.53(b) of U.S. patent application Ser. No. 14/905,101 filed Jan. 14, 2016, which was filed under 35 U.S.C. 371 claiming benefit of PCT Application No. PCT/EP2014/065571, filed on Jul. 21, 2014, which claims the benefit of GB 1313749.2, filed on Aug. 1, 2013, the contents of each of which are incorporated herein by reference.

FIELD OF THE DISCLOSURE

The invention relates to the assignment of location information to wireless local area network access points. Assigned location information can be stored, for example, in a positioning database for supporting a positioning of mobile devices.

BACKGROUND

Modern global cellular and non-cellular positioning technologies are based on generating large global databases containing information on cellular and non-cellular signals. Such databases are also referred to as radiomap databases. The information may originate entirely or partially from users of these positioning technologies. This approach is also referred to as "crowd-sourcing".

The information provided by users is typically in the form of "fingerprints", which contain a location that is estimated based on, e.g., received satellite signals of a global navigation satellite system (GNSS) and measurements taken from one or more radio interfaces for signals of a cellular and/or non-cellular terrestrial system. In the case of measurements on cellular signals, the results of the measurements may contain a global and/or local identification of the cellular network cells observed, their signal strengths and/or pathlosses and/or timing measurements like timing advance (TA) or round-trip time. For measurements on wireless local area network (WLAN) signals, as an example of signals of a non-cellular system, the results of the measurements may contain a basic service set identification (BSSTD), like the medium access control (MAC) address of observed access points (APs), the service set identifier (SSID) of the access points, and the signal strength of received signals (received signal strength indication RSSI or physical Rx level in dBm with a reference value of 1 mW, etc.).

This data may then be transferred to a server or cloud, where the data may be collected and where further models may be generated based on the data for positioning purposes. Such further models can be coverage area estimates, communication node positions and/or radio channel models and/or Rx fields, with base stations of cellular communication networks and access points of WLANs being example communication nodes. In the end, these refined models may be used for estimating the position of mobile terminals. The generated models may be stored in a radiomap database, optionally together with the collected data.

A positioning of a mobile terminal that is to make use of the radiomap can function in two modes. The first mode is a terminal-assisted mode, in which the terminal performs measurements on a cellular and/or non-cellular air interface and provides the measurement results to a remote server. The server carries out positioning computations for the terminal based on the received measurement results and the information in the radiomap database, and provides a position estimate back to the terminal. The second mode is a terminal-based mode, in which the terminal has a local copy of the radiomap or a subset of the global radiomap. Such a subset can be downloaded by the device from a remote server for the area of interest, for instance a small area around the current location, for a whole country, or some other region. The subset can also be pre-installed to the terminal in the factory. Also in this case, it may be desired to update the data at some point.

It may be noted that even when using a mobile terminal having GNSS-capabilities, a user may benefit from using cellular/non-cellular positioning technologies in terms of time-to-first-fix and power consumption. Also, not all applications require a GNSS based position. Furthermore, cellular/non-cellular positioning technologies work indoors as well, which is generally a challenging environment for GNSS based technologies.

SUMMARY OF SOME EMBODIMENTS OF THE INVENTION

A method is described which comprises, performed by at least one apparatus, receiving a message including results of measurements on signals of at least one wireless local area network access point. The method further comprises determining as a first condition at least one of whether the message comprises no indication of a position obtained in a non-cell based positioning of at least one predetermined kind and whether the message comprises no information enabling a non-cell based positioning of at least one predetermined kind. The method further comprises determining as a second condition whether the message comprises results of measurements on signals of at least one cell of a cellular communications network. The method further comprises, if at least the first condition and the second condition are met, attempting to determine a position based on the results of measurements on signals of the at least one cell of the cellular communications network. The method further comprises, if a position is determined, causing storage of location information that is based on the determined position in a memory for the at least one wireless local area network access point, in case no location information has previously been stored in the memory for the at least one wireless local area network access point.

Moreover an apparatus is described, which comprises means for realizing the actions of the presented method.

The means of the apparatus can be implemented in hardware and/or software. They may comprise for instance at least one processor for executing computer program code for realizing the required functions, at least one memory storing the program code, or both. Alternatively, it could comprise for instance circuitry that is designed to realize the required functions, for instance implemented in a chipset or a chip, like an integrated circuit. In general, the means may comprise for instance one or more processing means.

Moreover an apparatus is described, which comprises at least one processor and at least one memory including computer program code, the at least one memory and the computer program code configured to, with the at least one processor, cause an apparatus at least to perform the actions of the presented method.

Any of the described apparatuses may be a module or a component for a device, for example a chip. Alternatively, any of the mentioned apparatuses may be a device, for instance a server.

Any of the described apparatuses may further comprise only the indicated components or one or more additional components.

Moreover a system is described, which comprises one of the described apparatuses and a memory configured to store location information for a plurality of WLAN access points. Such a system could comprise various other devices, like a mobile device providing messages including results of measurements on signals of WLAN access points.

In certain embodiments, the described methods are information providing methods, and the described apparatuses are information providing apparatuses.

In certain embodiments of the described methods, the methods are methods for assigning location information to WLAN access points. In certain embodiments of the described apparatuses, the apparatuses are apparatuses for assigning location information to WLAN access points.

Moreover a non-transitory computer readable storage medium is described, in which computer program code is stored. The computer program code causes at least one apparatus to perform the actions of the presented method when executed by at least one processor.

The computer readable storage medium could be for example a disk or a memory or the like. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

It is to be understood also the respective computer program code by itself has to be considered an embodiment of the invention. The computer program code could also be distributed to several computer readable storage mediums.

It is to be understood that the presentation of the invention in this section is merely by way of example and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

Figure 1:
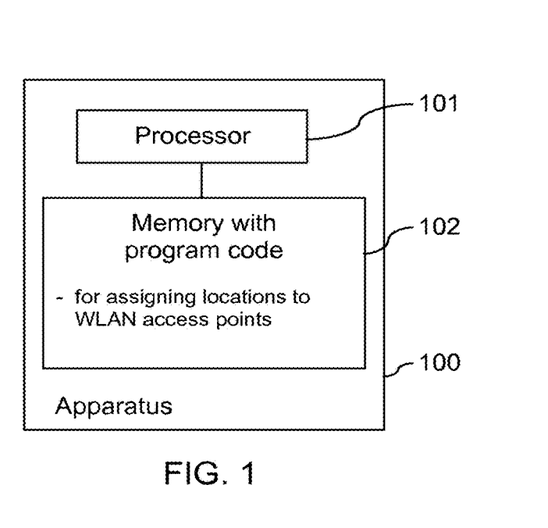
FIG. 1 is a schematic block diagram of an example embodiment of an apparatus.

FIG. 1 is a schematic block diagram of an example embodiment of an apparatus 100. Apparatus 100 comprises a processor 101 and, linked to processor 101, a memory 102. Memory 102 stores computer program code for assigning location information to WLAN access points. Processor 101 is configured to execute computer program code stored in memory 102 in order to cause an apparatus to perform desired actions.

Apparatus 100 could be a server or any other device. Apparatus 100 could equally be a module, like a chip, circuitry on a chip or a plug-in board, for a server or for any other device. Optionally, apparatus 100 could comprise various other components, like a data interface, a user interface, a further memory, a further processor, etc.

An operation of apparatus 100 will now be described with reference to the flow chart of FIG. 2. The operation is an example embodiment of a method according to the invention. Processor 101 and the program code stored in memory 102 cause an apparatus to perform the operation when the program code is retrieved from memory 102 and executed by processor 101. The apparatus that is caused to perform the operation can be apparatus 100 or some other apparatus, for example but not necessarily a device comprising apparatus 100.

The apparatus receives a message including results of measurements on signals of at least one WLAN access point. (action 201) Such results may also be referred to as observations. They may have been obtained by a mobile device in a scan of the environment.

The apparatus moreover determines, as a first condition, at least one of whether the message comprises no indication of a position obtained in a non-cell based positioning of at least one predetermined kind and whether the message comprises no information enabling a non-cell based positioning of at least one predetermined kind. (action 202) For example, if the apparatus processes specifically messages comprising fingerprints, it could only be checked whether the message includes an indication of a position that is based on any predetermined non-cell based positioning. Further for example, if the apparatus processes specifically messages comprising positioning requests, it could only be checked whether the message includes information enabling any predetermined non-cell based positioning. Further for example, if the apparatus processes both kinds of messages, it could be checked whether the message comprises any of the indicated types of content. Obviously, other combinations could be considered as well.

The apparatus moreover determines, as a second condition, whether the message comprises results of measurements on signals of at least one cell of a cellular communications network. (action 203) Signals of a cell are to be understood to be signals transmitted by a communication node of a cellular communications network, like a base station, for a particular cell of the cellular communications network. The results may have been obtained again by a mobile device in a scan of the environment.

It is to be understood that actions 202 and 203 could be performed in any desired order. They could also be performed entirely or partially in parallel. In example embodiments, action 203 could also be performed only, in case the first condition is met.

If at least the first condition and the second condition are met, the apparatus moreover attempts to determine a position based on the results of measurements on signals of the at least one cell of the cellular communications network. (action 204) It is to be understood that in example embodiments, any further condition could be considered. For instance, a position could be determined only if no location information has previously been stored in a memory for the at least one WLAN access point. This could also be determined by requesting the information from another apparatus. The success of the attempt to determine a position may depend for example on the availability of information on the at least one cell to the apparatus.

If a position is determined, the apparatus moreover causes storage of location information that is based on the determined position in a memory for the at least one WLAN access point in case no location information has previously been stored in the memory for the at least one WLAN access point. (action 205)

The invention proceeds from the consideration that a device, of which the position is to be determined, may only be able to perform a scan for WLAN access points. For example, the device may not support other radio interfaces, or other supported radio interfaces may be switched off. In this case, a position estimation could be attempted based on the available results of measurements on signals of WLAN access points and location information that is stored for WLAN access points in a positioning database.

However, if the positioning database does not contain location information for any of the WLAN access points identified in a scan results, a positioning may not be possible. Location information for a WLAN access point may not be in the positioning database for instance, because it has not yet been learned via GNSS-positioned fingerprints and/or WLAN-positioned fingerprints. Especially, there may be significant gaps in the availability of WLAN based positioning indoors, since it may be practically impossible to obtain GNSS-positioned fingerprints indoors.

The lack of location information for many WLAN access points in the positioning database may limit the availability of a positioning service, which may result in adverse user experience. In case the device is a WLAN-Cellular dual-mode device, the positioning can always fall-back from WLAN-based positioning to cell based positioning. In the case of a WLAN-only device, this is not possible.

Certain embodiments of the invention therefore provide that if a received message comprises results of measurements on signals of a WLAN access point and of a cell of a cellular communications network, location information for the WLAN access point is obtained by means of a cell based positioning, in case other information for obtaining the location is not available in the received message either. The determined location information may then be stored in a memory for the WLAN access point, in particular, if no location information for the WLAN access point has been stored in the memory so far.

Certain embodiments of the invention may thus have the effect that location information can be obtained for a much wider set of WLAN access points, which increases the availability of WLAN based positioning. While the accuracy of a cell based positioning is typically rather low, using a cell based positioning for obtaining location information for WLAN access points may have the effect that at least some position estimate for devices that are only able to scan for WLAN access points can be provided. An increased availability of WLAN based positioning, in turn, may result in a better user experience. The additional location information in the memory may be considered supporting a virtual cell based positioning fall-back for WLAN-only devices, for which a position is to be determined.

Figure 2:
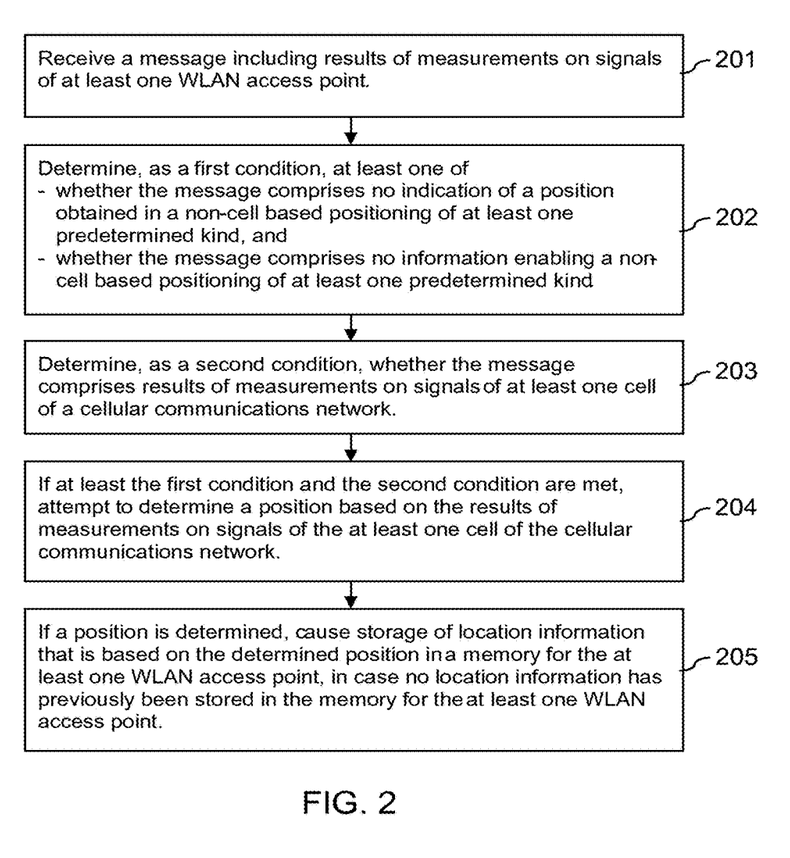
FIG. 2 is a flow chart illustrating an example embodiment of a method.

Apparatus 100 illustrated in FIG. 1 and the method illustrated in FIG. 2 may be implemented and refined in various ways.

In an example embodiment, location information stored in the memory for a respective WLAN access point is associated with an indication of a type of positioning on which the location information is based, the indication of a type of positioning being one of an indication of a satellite signal based positioning, an indication of a WLAN based positioning, an indication of a non-cell based positioning, and an indication of a cell based positioning. It is to be understood that indications of other types of positioning could be used as well. An indication of a non-cell based positioning could be used for instance instead of individual indications for a satellite signal based positioning and a WLAN based positioning or for any other combination. The indication of the type of positioning may provide information on the quality of the stored location information. This may have the effect location information that is already available in the memory for a particular WLAN access point may be handled differently depending on an expected quality of the stored location information.

An example embodiment is provided for the case that at least the above mentioned first condition and the above mentioned second condition are met, that a position is determined, that location information has previously been stored in the memory for the at least one wireless local area network access point and that the stored location information is associated with an indication that the location information is based on a cell based positioning. In this case, the location information stored in the memory for the at least one WLAN access point could be caused to be updated based on the determined position. This may have the effect that cell based location information that is stored for a particular WLAN access point may be improved if further cell based location information becomes available for this WLAN access point.

Updating of location information may be performed in many ways. For example, if the stored location information is simply an estimate of the actual location of the WLAN access point, the stored location estimate and the determined position may be used for generating a weighted average that may replace the stored location estimated. Further for example, if the stored location information comprises measured signal strengths of signals received from the WLAN access point mapped to grid points representing the respective position of measurement, a new location may be used for mapping an associated new measured signal strength in the received message to a corresponding grid point.

An example embodiment is provided for the case that the above mentioned first condition is not met, that location information has previously been stored in the memory for the at least one WLAN access point and that the stored location information is associated with an indication that the location information is based on a cell based positioning. In this case, the location information stored in the memory for the WLAN access point could be caused to be replaced with location information that is based on one of an indication of a position in the received message obtained in the non-cellular based positioning, and a position that is determined based on information in the received message enabling a non-cellular based positioning. This may have the effect that stored low quality cell based location information for a particular WLAN access point can be replaced by higher quality non-cell based location information as soon as such is available for the WLAN access point.

An example embodiment is provided for the case that at least the above mentioned first condition is met, that location information has previously been stored in the memory for the at least one WLAN access point and that the location information is associated with an indication that the location information is based on another type of positioning than a cell based positioning. In this case, no update of the location information stored in the memory for the at least one WLAN access point could be caused. This may have the effect that stored high quality non-cell based location information for a particular WLAN access point is not deteriorated by lower quality cell based location information.

In an example embodiment, it is determined separately for each of the at least one WLAN access point whether location information is stored in the memory. This may have the effect that information for a respective WLAN access point may be handled individually and thus optimally for each WLAN access point. It is to be understood that other criteria relating to individual WLAN access points may also be checked separately.

A non-cell based positioning of at least one predetermined kind could be of any desired kind. In an example embodiment, it could comprise at least one of a satellite signal based positioning and a WLAN based positioning. Both types of positioning may have the effect that they may result in more accurate positions than a cell based positioning. A satellite signal based positioning can evaluate signals from satellites of any desired GNSS or any desired combination of GNSSs, examples comprising the global positioning system (GPS), GLONASS or Galileo.

In an example embodiment, the message comprises a fingerprint provided by a mobile device for updating a positioning database, or a positioning request of a mobile device, or a positioning request for a mobile device. Using the presented approach for messages comprising fingerprints may allow extending the number of fingerprints that are usable for supplementing and updating a positioning database. Using the presented approach for messages comprising positioning requests may allow extending the types of messages and thus the amount of data that may be usable for supplementing and updating a positioning database significantly.

In an example embodiment, location information stored for a WLAN access point may be used for determining a coverage area of the WLAN access point, wherein the size of the coverage area is determined depending on the type of the positioning on which the location information is based. This may have the effect that the uncertainty of the location estimate can automatically be taken into account for example in those cases, in which the coverage area size is proportional to its weight in position estimate computations. For example, the size of the coverage area could be doubled or increased by a predetermined fixed value compared to the conventionally determined size, whenever the type of the positioning on which the location information is based is cell based.

Figure 3:
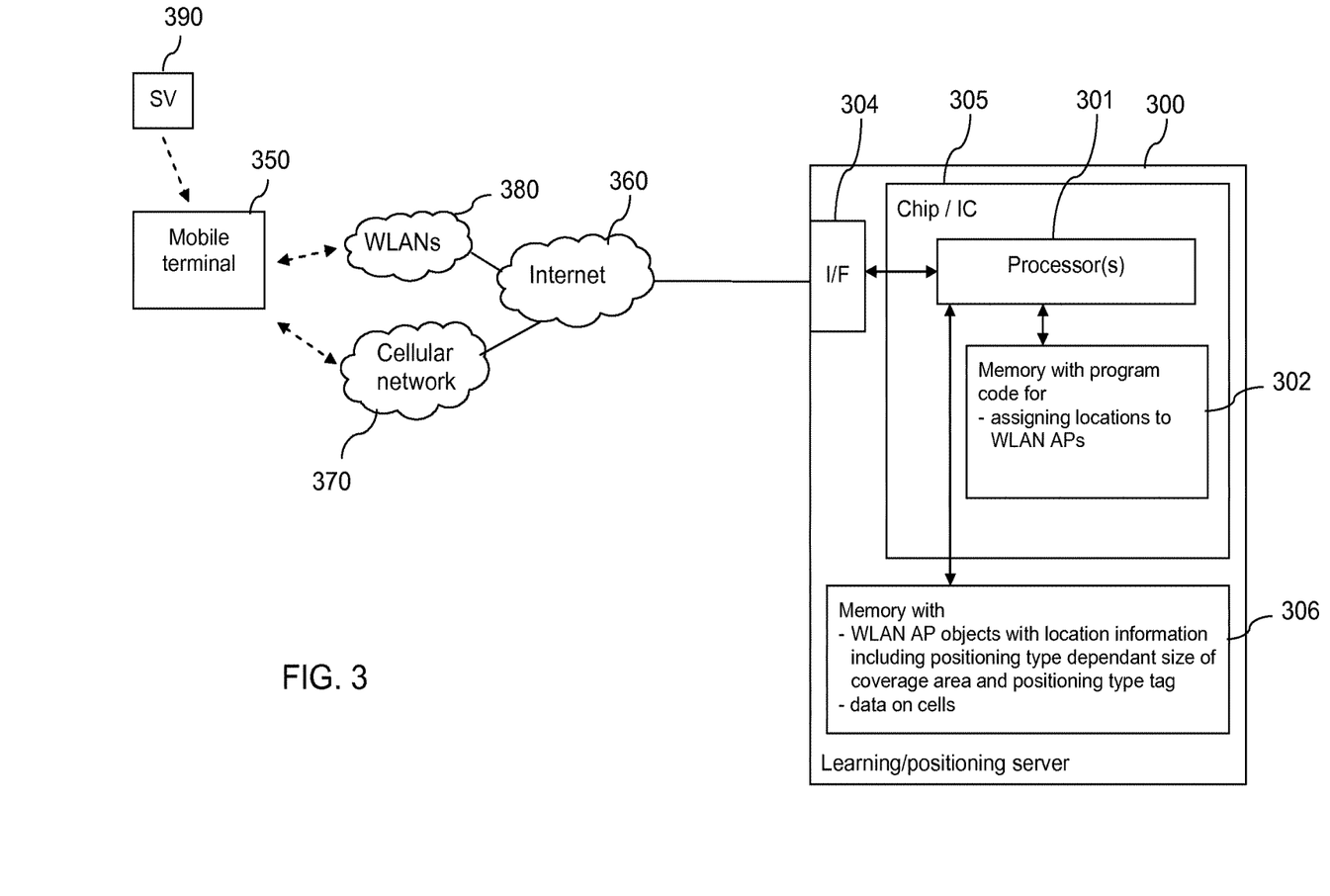
FIG. 3 is a schematic block diagram of an example embodiment of a system.

FIG. 3 is a schematic block diagram of an example embodiment of a system according to the invention. The system supports an assignment of location information to WLAN access points.

The system comprises a server 300 and a mobile terminal 350. The system further comprises a network 360, for example the Internet. Server 300 could also belong to network 360. The system further comprises at least one cellular communications network 370 and at least one WLAN 380, which are connected to network 360. The system further comprises satellites (space vehicles SV) 390 of at least one GNSS.

Server 300 may be for instance a dedicated learning/positioning server, or some other kind of server. It comprises a processor 301 that is linked to a first memory 302, to a second memory 306 and to an interface (I/F) 304. Processor 301 is configured to execute computer program code, including computer program code stored in memory 302, in order to cause server 300 to perform desired actions.

Memory 302 stores computer program code for assigning location information to WLAN access points. The computer program code may comprise for example similar program code as memory 102. In addition, memory 302 could store computer program code configured to realize other functions, like generating and storing radio channel models and carrying out positioning computations. In addition, memory 302 could also store other kind of data.

Processor 301 and memory 302 may optionally belong to a chip or an integrated circuit 305, which may comprise in addition various other components, for instance a further processor or memory.

Memory 306 can equally be accessed by processor 301. It is configured to store data of a positioning database, including information about WLAN access points. In a possible structure provided by the database, a WLAN object is provided for each WLAN access point for which information is available. The WLAN object may comprise the BSSID of the concerned WLAN access point as a key. The WLAN object may further comprises the actual data. The data may comprise for instance at least one set of RX grid data and at least one set of coverage area data. Each set of RX grid data could comprise for instance Rx signal levels mapped to a respective grid point. The respective signal has been received by a mobile terminal from the WLAN access point at a position close to the grid point and the RX signal level has been provided by the mobile terminal as fingerprint data. The grid could be continuously updated based on newly received fingerprints. The coverage area data may comprise for instance an indication of an assumed location of the WLAN access point, and in addition an indication of a range of the access point, that is, the size of the coverage area, or a pathloss model. Both range and pathloss model may also be provided in sectorized form. The indication of an assumed location of the WLAN access point may include Latitude and Longitude coordinates. The coverage area data could be computed and updated based on the stored Rx grid data. The coverage area data could be provided for use in position computations. Each WLAN object could furthermore comprise a tag indicating whether the location information is GNSS or WLAN based or cell based. For GNSS and WLAN based location information, the same tag or individual tags may be used. The stored data may also be used to detect outliers among newly received fingerprints. In addition, memory 306 could store other data, for instance data for an outlier grid and/or data on cells of a cellular communications network 370. It is to be understood that a memory storing any of the mentioned data could also be external to server 300; it could be for instance on another physical or virtual server.

Interface 304 is a component which enables server 300 to communicate with other devices, like terminal 350, via network 360. Interface 304 could comprise for instance a TCP/IP socket.

Component 305 or server 300 could be an example embodiment of an apparatus according to the invention.

Mobile terminal 350 is configured to scan for communication nodes, including for example WLAN access points and cellular nodes, in its environment. Optionally, mobile terminal 350 may also comprise a GNSS receiver, which is configured to compute the position of mobile terminal 350 based on received satellite signals. Mobile terminal 350 is moreover configured to be able to communicate with other devices via a cellular communication network 370 and/or via a WLAN 380.

Cellular communication network 370 could be based on any kind of cellular system, for instance a GSM system, a 3rd Generation Partnership Project (3GPP) based cellular system like a WCDMA system or a time division synchronous CDMA (TD-SCDMA) system, e.g. supporting high speed packet access (HSPA), a 3GPP2 system like a CDMA2000 system, a long term evolution (LTE) or LTE-Advanced system, or any other type of cellular system, like a WiMAX system. Cellular communication network 370 comprises a plurality of base stations or base transceiver stations as communication nodes.

Each WLAN 380 comprises at least one access point as a communication node.

The GNSS satellites 390 could comprise for instance GPS satellites, Galileo satellites, GLONASS satellites and/or satellites of any other system.

Example operations in the system of FIG. 3 will now be described with reference to FIG. 4.

Figure 4:
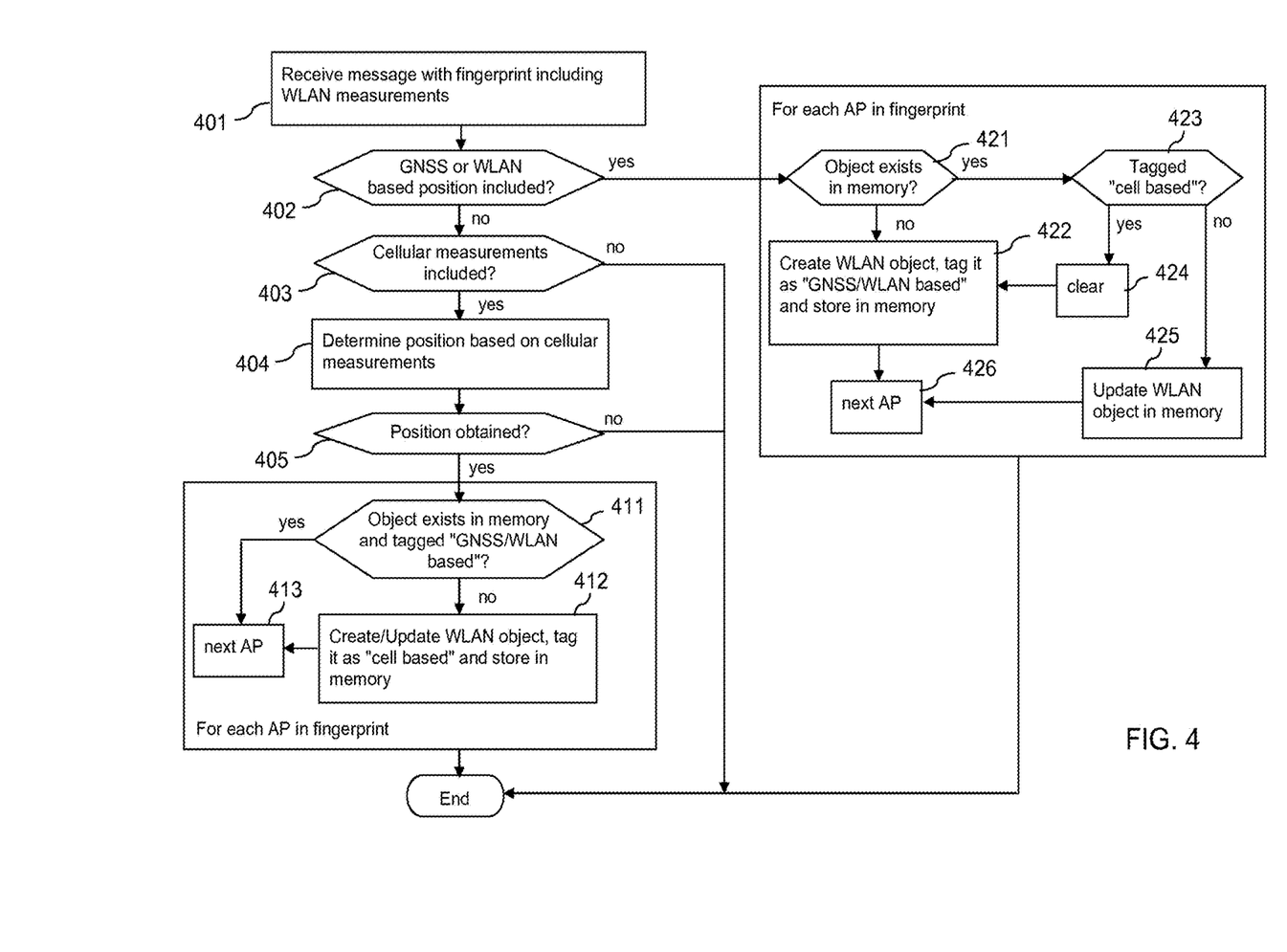
FIG. 4 is a flow chart illustrating an example embodiment of a method.

FIG. 4 is a flow chart illustrating operations at server 300. Processor 301 and some of the program code stored in memory 302 cause server 300 to perform the presented operations when the program code is retrieved from memory 302 and executed by processor 301.

For supporting the collection of learning data for a positioning database, mobile terminal 350 may scan the environment at regular intervals for WLAN access points and for cells of cellular communication networks. At the same time, it may determine its position using the integrated GNSS receiver whenever the GNSS receiver is activated and receives signals from a sufficient number of satellites 390. In general, mobile terminal 350 may provide measurement results of the scan along with an indication of a satellite signal based position as a fingerprint, and transmit the fingerprint in a message to server 300. Occasionally, however, mobile terminal 350 will not able to obtain a satellite signal based position. In this case, mobile terminal 350 could first try to obtain a position estimate based on the results of measurements on WLAN access points using a positioning request to server 300. If memory 306 of server 300 comprises data on the WLAN access points, server 300 may compute a position and provide it to mobile terminal 350. Mobile terminal 350 may then include this WLAN based position in the fingerprint. However, in some cases, memory 306 of server 300 may not comprises data on any of the WLAN access points that have been detected in the scan. In this case, mobile terminal 350 does not include any indication of a position in the fingerprint in the message to server 300. The measurement results may comprise for each detected WLAN access point and for each detected communication node of a cellular communications network an identifier and optionally some other data, like an indication of a received signal strength.

In the presented example, server 300 may receive a message from mobile terminal 350 and extract a fingerprint including results of measurements on signals of at least one WLAN access point. (action 401) Such results of measurements are also referred to as WLAN measurements.

Server 300 determines whether the fingerprint includes as well an indication of a satellite signal based position or of a WLAN based position. (action 402)

If the fingerprint does not include an indication of such a non-cell based position, server 300 determines whether the fingerprint includes any results of measurements on signals of cells of a cellular communications network. (action 403) Such results of measurements are also referred to as cellular measurements. In case the fingerprint does not include any cellular measurements either, the fingerprint is discarded.

In case the fingerprint includes cellular measurements, server 300 attempts to determine a position based on these cellular measurements. (action 404) In case memory 306 comprises data on cells, the positioning could be attempted based on this data. Server 300 could also access another database providing data for all or some cells of at least one cellular communications network. The data could comprise in each case for example an indication of a location estimate, an indication of an estimated size of the coverage area of the cell and/or a pathloss model. The attempt would fail, if data for the particular cells, for which cellular measurements are included in the fingerprint, is not available in the used database.

If the cell based positioning attempt fails (action 405), the fingerprint equally is discarded.

If server 300 is able to obtain a cell based position in contrast (action 405), a first processing loop is entered and run through for each of the WLAN access points for which WLAN measurements are included in the fingerprint.

First, it is determined, whether an object exists in memory 306 for the respectively considered WLAN access point and whether this object is tagged to comprise location information that is GNSS or WLAN based. (action 411)

If this is the case, no further action is performed and the process is continued with action 411 for the next access point. (action 413)

Otherwise, a WLAN object is created or updated. (action 412)

More specifically, if no object exists in memory 306 for the considered WLAN access point, a WLAN object is created, provided with a tag "cell based" and stored in memory 306. The tag indicates that the access point has been learned with position information of lower quality.

If an object tagged to be "cell based" already exists in memory 306 for the WLAN access point, the data in the object is updated. Updating the data may mean for example that an Rx level indication in the WLAN measurements for the WLAN access point could be stored as an additional value to an existing Rx level grid using the computed cell based position as reference for the correct grid point. Updating the data may also mean computing a new location estimate for the WLAN access point based on the stored information and the computed cell based position.

The process is continued with action 411 for the next access point (action 413), until all WLAN access points, for which WLAN measurements are included in the fingerprint, have been considered.

If server 300 determined in action 402 that the fingerprint in the received message comprises a GNSS or WLAN based position, a second processing loop is entered and run through for each of the WLAN access points for which WLAN measurements are included in the fingerprint.

First, it is determined, whether an object exists in memory 306 for the respectively considered WLAN access point. (action 421)

If this is not the case, a WLAN object is created, provided with a tag "GNSS/WLAN based" and stored in memory 306. (action 422) The tag indicates that the access point has been learned with position information of higher quality.

Then, the process is continued with action 421 for the next access point. (action 426)

If it is determined, in contrast, that an object exists in memory 306 for the respectively considered WLAN access point (action 421), it is furthermore determined whether this object is tagged to comprise location information that is cell based. (action 423)

If this is not the case, the WLAN object is updated in memory 306 using the newly received WLAN measurements. (action 425) That is, the existing information is supplemented and/or existing information is recomputed based on the existing information and the newly received WLAN measurements, for example in a similar manner as described above for the update case of action 412. Then, the process is continued with action 421 for the next access point. (action 426)

Otherwise, the WLAN object is cleared. (action 424) This may mean that the existing object is deleted completely. In this case, a new WLAN object is created from scratch, provided with a tag "GNSS/WLAN based" and stored in memory 306. (action 422) Alternatively, all information in the existing object except for the WLAN identifier could be reset in action 424. In this case, the existing object could be reused with entirely new information in action 422. Then, the process is continued with action 421 for the next access point. (action 426)

The motivation to clear an existing object in action 424 in an example embodiment is that a cell based position can be assumed to be much worse in quality than a GNSS/WLAN based position. Thus whenever there is a WLAN/GNSS based position available for a WLAN access point that was previously learned with cell based position, it may make sense to reset the object as a whole. For a similar reason, no update is performed, if it is determined in action 411 that an object exists in memory 306 that is tagged "GNSS/WLAN based", because this would mean updating high quality location information with a low-quality cell based position estimate.

The data in memory 306 or derived information may be made available for a positioning of mobile devices based on positioning requests that include WLAN measurements, either by server 300 or by some other server.

Stored location information can also be used to update the WLAN access point coverage area estimate recursively as described by Laura Koski in "Positioning with Bayesian coverage area estimates and location fingerprints", master's thesis, Tampere University, 2010. In case of recursive update, the uncertainty of the location estimate can be taken into account making the coverage area greater for access points that have been learned with cell based position. In the positioning phase, the coverage area size may be proportional to its weight in the position estimate and affect the calculation of the reported uncertainty. The update of the coverage area can be performed as a part of the update in actions 412, 422 and 425, respectively, or in a separate action.

It is to be understood that the presented example operation may be varied in many ways. For instance, the order of actions could be modified. To provide an example, checking at first in actions 404 and 405 whether a cell based positioning attempt is successful before evaluating whether such a position may actually be of use in action 411 may have the effect that the database access can be minimized. It is to be understood, however, that for other embodiments the order may be changed. Furthermore, if no GNSS based position is available at mobile terminal 350, mobile terminal 350 could also transmit a message including a fingerprint without position right away to server 300, instead of trying at first to obtain a position estimate based on the results of measurements on WLAN access points using a positioning request. In this case, server 300 could check in action 402 not only whether a position is included, but also whether a WLAN based position can be determined from the included WLAN measurements. If this is possible, such a WLAN based position could then be used in the same manner as a position included in a fingerprint for the further processing. Furthermore, instead of messages comprising fingerprints, it would also be possible to process messages comprising a positioning request for creating or updating WLAN objects that are tagged to be cell based. In this case, action 402 of FIG. 4 and the associated second loop with actions 421 to 425 may simply be omitted. Alternatively, server 300 could also check in this alternative in action 402 whether a WLAN based position can be determined from the included WLAN measurements. If this is possible, such a WLAN based position could then be used again in the same manner as a position included in a fingerprint for the further processing.

Summarized, certain embodiments of the invention may have the effect that location estimates can be obtained for a much wider set of WLAN access points, which increases the availability of WLAN based positioning.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory (ROM), a random access memory (RAM), a flash memory or a hard disc drive memory etc.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

Figure 5:
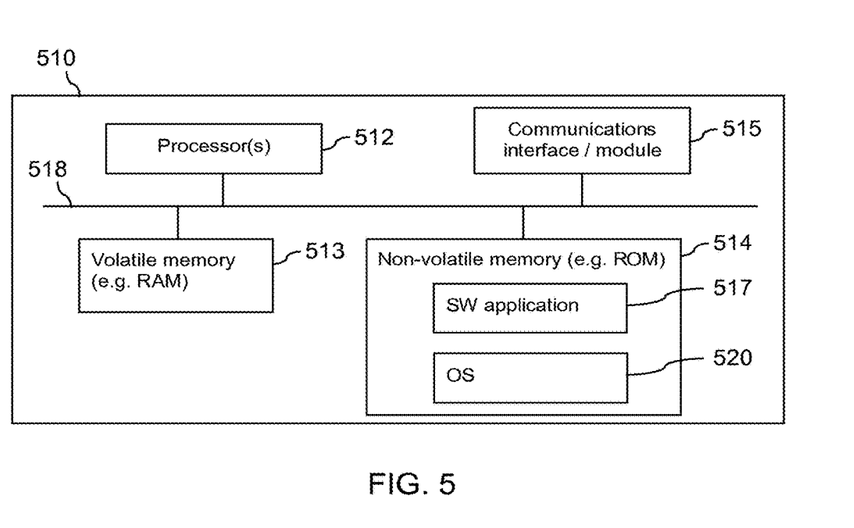
FIG. 5 is a schematic block diagram of an example embodiment of an apparatus.
Figure 6:
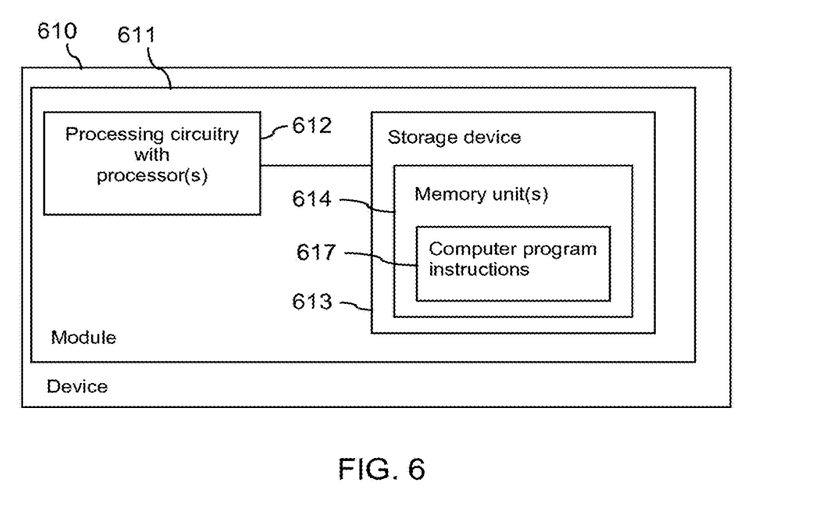
FIG. 6 is a schematic block diagram of an example embodiment of an apparatus and
FIG. 7 schematically illustrates example removable storage devices.

Example embodiments using at least one processor and at least one memory as a non-transitory data medium are shown in FIGS. 5 and 6.

FIG. 5 is a schematic block diagram of a device 510. Device 510 includes a processor 512. Processor 512 is connected to a volatile memory 513, such as a RAM, by a bus 518. Bus 518 also connects processor 512 and RAM 513 to a non-volatile memory 514, such as a ROM. A communications interface or module 515 is coupled to bus 518, and thus also to processor 512 and memories 513, 514. Within ROM 514 is stored a software (SW) application 517. Software application 517 may be a navigation application, although it may take some other form as well. An operating system (OS) 520 also is stored in ROM 514.

FIG. 6 is a schematic block diagram of a device 610. Device 610 may take any suitable form. Generally speaking, device 610 may comprise processing circuitry 612, including one or more processors, and a storage device 613 comprising a single memory unit or a plurality of memory units 614. Storage device 613 may store computer program instructions that, when loaded into processing circuitry 612, control the operation of device 610. Generally speaking, also a module 611 of device 610 may comprise processing circuitry 612, including one or more processors, and storage device 613 comprising a single memory unit or a plurality of memory units 614. Storage device 613 may store computer program instructions that, when loaded into processing circuitry 612, control the operation of module 611.

The software application 517 of FIG. 5 and the computer program instructions 617 of FIG. 6, respectively, may correspond e.g. to the computer program code in any of memories 102 or 302.

Figure 7:
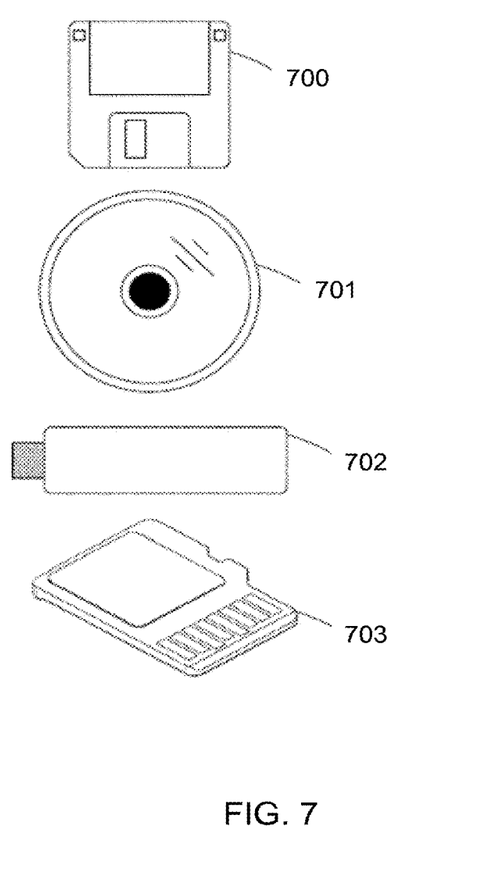

In example embodiments, any non-transitory computer readable medium mentioned in this text could also be a removable/portable storage or a part of a removable/portable storage instead of an integrated storage. Example embodiments of such a removable storage are illustrated in FIG. 7, which presents, from top to bottom, schematic diagrams of a magnetic disc storage 700, of an optical disc storage 701, of a semiconductor memory circuit device storage 702 and of a Micro-SD semiconductor memory card storage 703.

The functions illustrated by processor 101 in combination with memory 102, or processor 301 in combination with memory 302, or the integrated circuit 305 can also be viewed as means for receiving a message including results of measurements on signals of at least one wireless local area network access point; means for determining as a first condition at least one of whether the message comprises no indication of a position obtained in a non-cell based positioning of at least one predetermined kind and whether the message comprises no information enabling a non-cell based positioning of at least one predetermined kind; means for determining as a second condition whether the message comprises results of measurements on signals of at least one cell of a cellular communications network; means for attempting, if at least the first condition and the second condition are met, to determine a position based on the results of measurements on signals of the at least one cell of the cellular communications network; and means for causing, if a position is determined, storage of location information that is based on the determined position in a memory for the at least one wireless local area network access point, in case no location information has previously been stored in the memory for the at least one wireless local area network access point, The program codes in memories 102 and 302 can also be viewed as comprising such means in the form of functional modules.

FIGS. 2 and 4 may also be understood to represent example functional blocks of computer program codes supporting a coverage area modeling.

It will be understood that all presented embodiments are only examples, and that any feature presented for a particular example embodiment may be used with any aspect of the invention on its own or in combination with any feature presented for the same or another particular example embodiment and/or in combination with any other feature not mentioned. It will further be understood that any feature presented for an example embodiment in a particular category may also be used in a corresponding manner in an example embodiment of any other category.

What is claimed is:

1. A method comprising, performed by an apparatus:
receiving a message including results of measurements on signals of at least one wireless local area network access point, the message further including an indication of a position obtained in a non-cell based positioning or information enabling a non-cell based positioning;
determining as a condition whether location information is stored in a memory for the at least one wireless local area network access point and associated with an indication of a cell based positioning; and
in response to the condition being met, causing replacement of the stored location information in the memory by location information that is based on the indication of a position obtained in a non-cell based positioning in the received message or the information enabling a non-cell based positioning in the received message, and associating it with an indication of a non-cell based positioning.

2. The method according to claim 1, further comprising in the case that no location information for the at least one wireless local area network access point is stored in the memory:
causing storage of location information for the at least one wireless local area network access point in the memory, the location information being based on the indication of a position obtained in a non-cell based positioning in the received message or the information enabling a non-cell based positioning in the received message, and associating an indication of a non-cell based positioning with the stored location information.

3. The method according to claim 1, further comprising in the case that location information is stored in the memory for the at least one wireless local area network access point and associated with an indication of a non-cell based positioning:
updating the location information for the at least one wireless local area network access point that is stored in the memory based on the stored location and on the indication of a position obtained in a non-cell based positioning in the received message or the information enabling a non-cell based positioning in the received message.

4. The method according to claim 3, wherein updating location information that is stored in the memory comprises one of:

supplementing location information that is stored in the memory for the at least one wireless local area network access point based on the indication of a position obtained in a non-cell based positioning in the received message or the information enabling a non-cell based positioning in the received message; or recomputing location information for the at least one wireless local area network access point based on stored location information and on the indication of a position obtained in a non-cell based positioning in the received message or the information enabling a non-cell based positioning in the received message.

5. The method according to claim 1, wherein the non-cell based positioning is one of:
   a satellite signal based positioning; or
   a wireless local area network based positioning; or
   a satellite signal or wireless local area network based positioning.

6. The method according to claim 1, wherein it is determined separately for each of the at least one wireless local area network access point whether location information is stored in the memory.

7. The method according to claim 1, wherein the message comprises one of a fingerprint provided by a mobile terminal for updating a positioning database, a positioning request of a mobile terminal and a positioning request for a mobile terminal.

8. The method according to claim 1, further comprising using location information stored for a wireless local area network access point for determining a coverage area of the wireless local area network access point, wherein a size of the coverage area is determined depending on a type of positioning on which the location information is based.

9. An apparatus comprising at least one processor and at least one memory including computer program code, the at least one memory and the computer program code configured to, with the at least one processor, cause at least one apparatus at least to perform:
   receive a message including results of measurements on signals of at least one wireless local area network access point, the message further including an indication of a position obtained in a non-cell based positioning or information enabling a non-cell based positioning;
   determine as a condition whether location information is stored in a memory for the at least one wireless local area network access point and associated with an indication of a cell based positioning; and
   in response to the condition being met, cause replacement of the stored location information in the memory by location information that is based on the indication of a position obtained in a non-cell based positioning in the received message or the information enabling a non-cell based positioning in the received message, and associate it with an indication of a non-cell based positioning.

10. The apparatus according to claim 9, wherein the computer program code is further configured to, with the at least one processor, cause the at least one apparatus to perform the following in the case that no location information for the at least one wireless local area network access point is stored in the memory:
   cause storage of location information for the at least one wireless local area network access point in the memory, the location information being based on the indication of a position obtained in a non-cell based positioning in the received message or the information enabling a non-cell based positioning in the received message, and associate an indication of a non-cell based positioning with the stored location information.

11. The apparatus according to claim 9, wherein the computer program code is further configured to, with the at least one processor, cause the at least one apparatus to perform the following in the case that location information is stored in the memory for the at least one wireless local area network access point and associated with an indication of a non-cell based positioning:
   update the location information for the at least one wireless local area network access point that is stored in the memory based on the stored location and on the indication of a position obtained in a non-cell based positioning in the received message or the information enabling a non-cell based positioning in the received message.

12. The apparatus according to claim 11, wherein updating location information that is stored in the memory comprises one of:
   supplementing location information that is stored in the memory for the at least one wireless local area network access point based on the indication of a position obtained in a non-cell based positioning in the received message or the information enabling a non-cell based positioning in the received message; or
   recomputing location information for the at least one wireless local area network access point based on stored location information and on the indication of a position obtained in a non-cell based positioning in the received message or the information enabling a non-cell based positioning in the received message.

13. The apparatus according to claim 9, wherein the non-cell based positioning is one of:
   a satellite signal based positioning; or
   a wireless local area network based positioning; or
   a satellite signal or wireless local area network based positioning.

14. The apparatus according to claim 9, wherein the computer program code is configured to, with the at least one processor, cause the at least one apparatus to determine separately for each of the at least one wireless local area network access point whether location information is stored in the memory.

15. The apparatus according to claim 9, wherein the message comprises one of a fingerprint provided by a mobile terminal for updating a positioning database, a positioning request of a mobile terminal and a positioning request for a mobile terminal.

16. The apparatus according to claim 9, wherein the computer program code is further configured to, with the at least one processor, cause the at least one apparatus to use location information stored for a wireless local area network access point for determining a coverage area of the wireless local area network access point, wherein a size of the coverage area is determined depending on a type of positioning on which the location information is based.

17. The apparatus according to claim 9, wherein the apparatus is one of:
   a server;
   a component for a server; and/or
   a part of a system which comprises in addition a memory configured to store location information for a plurality of wireless local area network access points.

18. A non-transitory computer readable storage medium in which computer program code is stored, the computer program code when executed by a processor causing at least one apparatus to perform the following:
- receive a message including results of measurements on signals of at least one wireless local area network access point, the message further including an indication of a position obtained in a non-cell based positioning or information enabling a non-cell based positioning;
- determine as a condition whether location information is stored in a memory for the at least one wireless local area network access point and associated with an indication of a cell based positioning; and
- in response to the condition being met, cause replacement of the stored location information in the memory by location information that is based on the indication of a position obtained in a non-cell based positioning in the received message or the information enabling a non-cell based positioning in the received message, and associate it with an indication of a non-cell based positioning.

* * * * *